United States Patent
Glauner et al.

[11] Patent Number: 6,006,073
[45] Date of Patent: Dec. 21, 1999

[54] APPARATUS AND METHOD FOR IMPROVEMENT OF TRANSMISSION QUALITY IN A POINT-TO-MULTIPOINT RADIO TRANSMISSION SYSTEM

[75] Inventors: Martin Glauner, Remshalden; Tillmann Eckstein, Schwaikheim; Andreas Bollmann, Esingen, all of Germany

[73] Assignee: Robert Bosch GmbH, Stuttgart, Germany

[21] Appl. No.: 08/966,989

[22] Filed: Nov. 10, 1997

[30] Foreign Application Priority Data

Nov. 9, 1996 [DE] Germany ............................ 196 46 371

[51] Int. Cl.[6] .............................. H04Q 7/20; H04Q 17/00
[52] U.S. Cl. ........................ 455/67.1; 455/423; 455/67.3; 455/524; 455/422; 375/227; 375/221; 375/220
[58] Field of Search .................................. 455/67.1, 423, 455/63, 500, 501, 67.4, 524, 422, 9, 10, 67.3, 93, 115; 375/220, 221, 227

[56] References Cited

U.S. PATENT DOCUMENTS

| | | | |
|---|---|---|---|
| 5,583,886 | 12/1996 | Rohani et al. ............................ | 375/227 |
| 5,706,333 | 1/1998 | Grenning et al. ........................ | 455/67.1 |
| 5,710,980 | 1/1998 | Ueda ........................................ | 455/67.4 |
| 5,719,898 | 2/1998 | Davidaovici et al. ................... | 375/200 |
| 5,799,243 | 8/1998 | Ojaniemi ................................. | 455/519 |
| 5,845,209 | 12/1998 | Iwata ....................................... | 455/67.1 |
| 5,898,730 | 4/1999 | Hensley et al. .......................... | 375/227 |
| 5,905,963 | 5/1999 | Kysejko ................................... | 455/423 |

*Primary Examiner*—Wellington Chin
*Assistant Examiner*—Simon Nguyen
*Attorney, Agent, or Firm*—Michael J. Striker

[57] ABSTRACT

The radio transmission system includes at least one base station (BS1,BS2) and several participant stations (T111, . . . ,T222), in which the radio transmission range (Z1,Z2) belonging to each base station (BS1, BS2) is divided into several sectors (S11, . . . ,S22). The radio transmission system performs an automatic interference analysis in which a test channel is established between each participant station (T111, . . . ,T222) and all those sectors (S11, . . . ,S22) which cause interferences with the concerned participant station. A signal path-attenuation value is determined from the transmission power and received power of the test channel for each signal path between the participant stations (T111, . . . ,T222) and sectors (S11, . . . ,S22) and a carrier signal-to-noise ratio is determined for each participant station (T111, . . . ,T222) from all the signal path attenuation values contributing to it. When this carrier signal-to-noise ratio is below a predetermined threshold, a more robust type of modulation is used for the data signal transmission between the concerned participant station (T111, . . . ,T222) and the sector (S11, . . . ,S22) associated with it and/or the transmitted signal carrier is changed to another different frequency channel, for at least the sector (S11, . . . ,S22) which causes the greatest interference.

12 Claims, 2 Drawing Sheets

Fig. 1

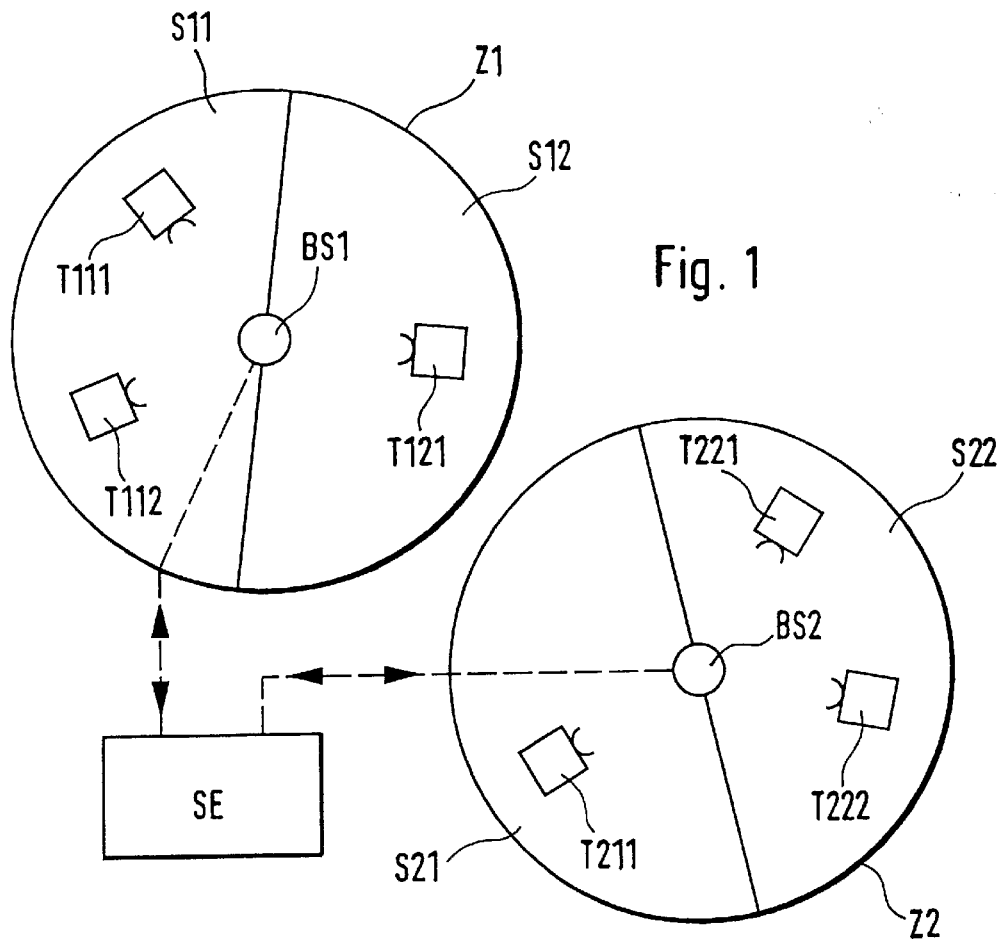

APPARATUS AND METHOD FOR IMPROVEMENT OF TRANSMISSION QUALITY IN A POINT-TO-MULTIPOINT RADIO TRANSMISSION SYSTEM

BACKGROUND OF THE INVENTION

The present invention relates to a method and an apparatus for improvement of transmission quality in a point-to-multipoint radio transmission system, comprising at least one base station and a plurality of participant stations, in which the radio transmission region belonging to each base station comprises one or more sectors and the base station has a transmitting and receiving unit for each individual sector so that data transmission can occur between the transmitting and receiving unit for each sector and the participating stations present in that sector. This type of point-to-multipoint radio transmission system is, e.g., described in German Patent Application DE 44 26 183 C1.

Radio transmission systems, which may be terrestrial radio relay systems or satellite transmission systems, allow new radio links to be installed very quickly or existing ones to be completed. The available frequency spectrum should be used in as optimum a manner as possible with such radio transmission systems. In a point-to-multipoint radio system according to German Patent Application DE 44 26 183 C1 the transmission capacity is adjusted or fit in a flexible manner to the requirements of the participant so that the bandwidth of the individual transmission channels is adjusted to the data transmission rate required by the individual participant stations. Here a variable adjustment of the modulation method (e.g. N-PSK, with N=4 . . . 16 or M-QAM with M=4 . . . 256) is also provided in the individual transmission channels.

In order to guarantee high transmission quality in a radio transmission system, disturbing interferences should be avoided as much as possible. Moreover geographic conditions which can cause interference are already considered in radio field planning. Interference can arise in a base station or a participant station by reflection of the transmitted signals themselves until the loss level can extinguish the signal. Also signals from neighboring radio transmission regions can cause interference at a participant station or a base station. Generally interference cannot be sufficiently accurately determined in advance by radio field calculations during the planning phase of a radio transmission system. This is particularly true because of changes of terrain structures, vegetation or house building, or completion or change of the radio network during operation of the radio transmission system.

SUMMARY OF THE INVENTION

It is an object of the present invention to provide an improved apparatus and method of the above-described type, with which an interference analysis can be performed without great expense at a predetermined time and the transmission quality can be improved according to that analysis by changing suitable radio field parameters.

In a radio transmission system, which includes at least one base station and several participant stations, in which the radio transmission region associated with each base station comprises one or more sectors, these objects are attained by a method according to the features set forth in the following. A test channel is transmitted between each participant station and the transmitter/receiver units of all those sectors which can cause interferences in the concerned participant station. The signal path-attenuation values between the individual participant stations and the transmitter/receiver units of the sectors is determined from the transmission power and the received power of the test channel. Then carrier signal-to-noise ratios are determined for each participant station from all the signal path-attenuation values contributing to them and realistic assumptions regarding the transmitted power of the interfering signals. Finally when the carrier signal-to-noise ratio is below a predetermined threshold for a participant station, the modulation of a data signal transmitted between it and the transmitter/receiver unit of the sector which is associated with it is changed into a robust modulation and/or a transmission signal carrier for it is changed from one frequency channel to another, at least in the sector causing the greatest interference for that participant station.

This interference analysis and the improvement in transmission quality resulting from it can be performed by the radio transmission system on its own. The method is a matter of an adaptive process which causes an optimum suppression of the interferences.

In accordance with a preferred embodiment the method also includes determining the carrier signal-to-noise ratio for each sector from the signal path-attenuation values associated with that sector for which the signal-to-noise ratio is being determined, and reducing transmission power and/or switching a transmission signal carrier from one frequency channel to another when the signal-to-noise ratio is below a predetermined threshold, at least for the participant station which causes a largest amount of interference for the respective sector.

According to other embodiments of the invention the test channel conveys information regarding transmission power and regarding which sector and/or participant station are transmitting the transmission power. Advantageously the test channel is transmitted from individual sectors or participant stations in a predetermined fixed time pattern. This is particularly significant when the test channel for a single participant station or section is so strongly attenuated that it can no longer be demodulated. It is particularly appropriate that the signal path-attenuation values are measured by a central control unit and stored in an attenuation matrix. The carrier signal-to-noise ratio can be computed in a central control unit and it can also perform the threshold value decision. The distribution resulting from the interference analysis of the frequency channel for the individual signal paths and the sectors associated with them can be stored in the control unit in a frequency channel matrix.

In the event of frequency selective fading it is particularly significant in a preferred embodiment that the test channel between the participant stations and sectors is transmitted again on another carrier frequency.

The method according to the invention in preferred embodiments is repeated after each new installation of a participant station or after a change of the building structures or the vegetation, and also it can be periodically repeated to account for changes in interference.

BRIEF DESCRIPTION OF THE DRAWING

The objects, features and advantages of the present invention will now be illustrated in more detail by the following detailed description, reference being made to the accompanying drawing in which:

FIG. 1 is diagram of a point-to-multipoint transmission system with two radio transmission regions, FIG. 2 is a matrix for signal path attenuation values.

DESCRIPTION OF THE PREFERRED EMBODIMENTS

Figure 3:
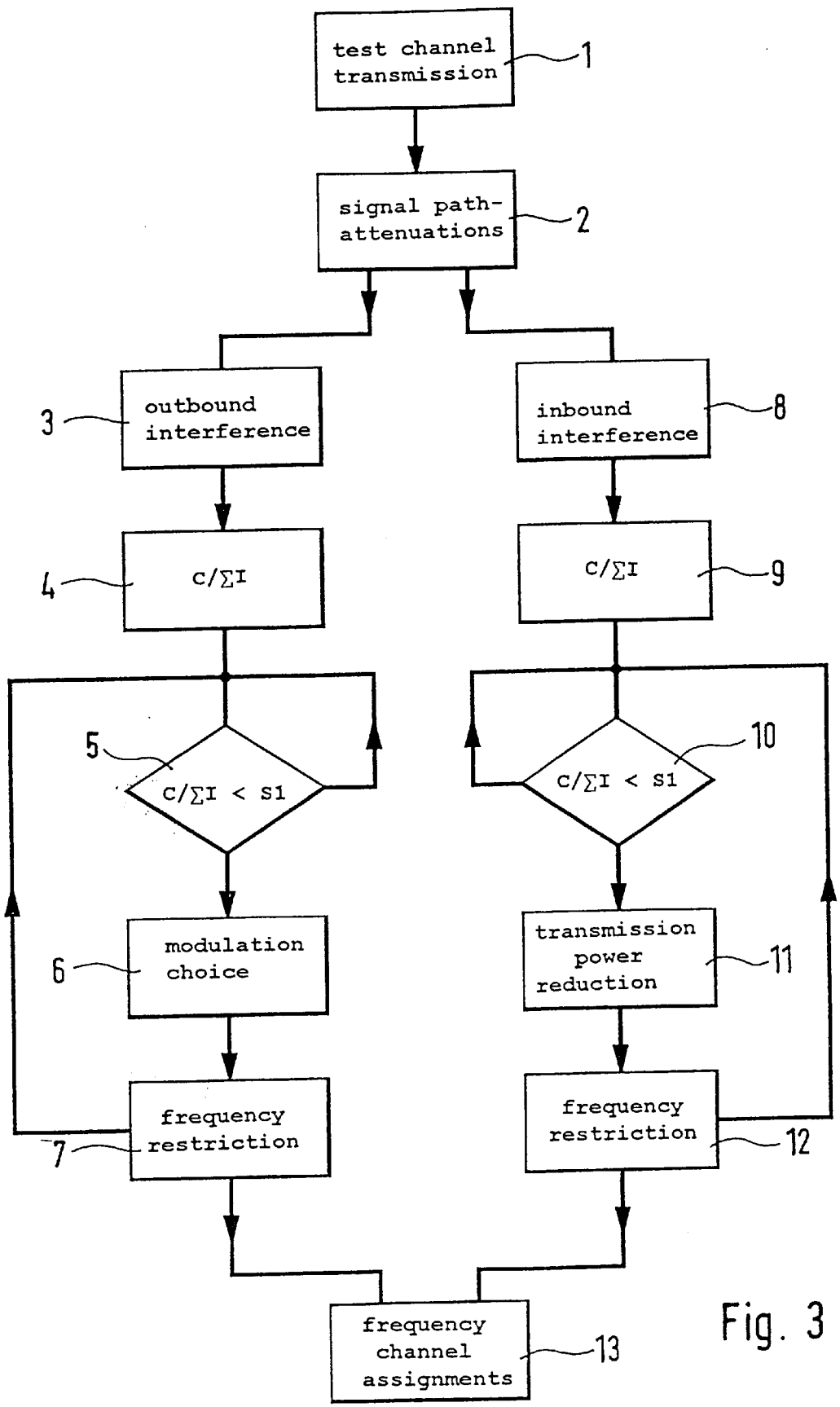
FIG. 3 is a flow chart for a method according to the invention of controlling the interference analysis of the radio transmission system.

FIG. 1 shows a diagram of a point-to-multipoint radio transmission system with two radio transmission regions Z1 and Z2. A base station BS1, BS2 is located in each radio transmission region Z1,Z2. Furthermore each radio transmission region Z1 and Z2 is divided into at least two sectors S11, S12 and S21, S22. The radio transmission regions however need not be divided into multiple sectors as in this embodiment. A radio transmission region, which is not divided into several sectors, is a radio transmission region with only one sector. The multiple sectoring of the radio transmission region arises because the base stations BS1 and BS2 have antennas radiating sector-wise, so that the base stations BS1 and BS2 can communicate independently of each other with participant stations T111, T112, T121 and T211, T221, T222 installed in the individual sectors. The participant stations T111 and T112 are located in sector S11, the participant station T121, in sector S12 and the participant station T211, in sector S21 and the participant station T221 and T222 in sector S22. In practice in reality the radio transmission regions can be divided into more than only two sectors and also more than only two participant stations can be found in each sector. In the embodiment illustrated in the drawing the numbers of radio transmission regions Z1,Z2, the sectors S11, S12, S21, S22 and the participant stations T111, T112, T121, T211, T221, T222 are chosen to be small so that subsequently the illustrated method for improving the transmission quality in the radio transmission system can be understood and examined.

As shown in FIG. 1 also a central control unit SE is also part of the point-to-multipoint radio transmission system and is connected to all base stations BS1,BS2.

An interference analysis performed during the planning of the point-to-multipoint radio transmission system does not determine the occurring real interferences with the desired accuracy; particularly it does not determine those interferences which occur subsequently due to geographic, vegetation or structural changes inside the radio network. An interference analysis determining reliably the real interference behavior in the radio network is performed with the subsequently described method. It is an adaptive interference analysis which the radio transmission system itself automatically performs. Thus the interference analysis, e.g. after each new installation of a participant station or after a change of the building structures or the vegetation in the radio transmission region, is again periodically iteratively repeated.

Differences in the interference analysis occur between two transmission directions. The one direction, designated as outbound link, concerns the signals transmitted by the base stations BS1,BS2 to the participant stations. The other direction, designated as inbound link, concerns the signals which are transmitted from the participant stations to their associated base stations. Now a few interference situations should be illustrated for the outbound link and for the inbound link. If the base station BS1 transmits a data signal in a predetermined frequency channel, e.g. in an outbound link to the participant station T111, a signal, which is transmitted in the same frequency channel from the base station BS2 of the neighboring radio transmission region Z2 to the participant station T211 in sector S21 can also reach this participant station T111. This thus causes an interference of the signal transmitted from the section S21 of the base station BS2 at the participant station T111. The reverse can also occur in an inbound link, when, e.g., the participant station T121 in sector S12 transmits a data signal to the base station BS1, the same base station BS1 receives a signal transmitted in the same frequency channel, e.g. from the participant station T222 in sector S22 of the base station BS2 of the radio transmission region Z2; this signal produces an interference in the base station BS1. Thus naturally interferences can be produced in the inbound link and the outbound link of several participant stations or base stations.

In order to determine all possible occurring interferences, above all signal paths present in the radio transmission system determine the attenuation. A test channel is used in operation with a fixed predetermined frequency and a constant power level. All base stations BS1,BS2 transmit this test channel one after the other from each sector S11,S12, S21,S22. Each participant station determines the associated signal path-attenuation from the receiver power measured by the individual participant station and the information transmitted over the test channel regarding the transmission power. The signal path-attenuation values determined by all the participant stations are transmitted to the central control unit SE by the bases stations from the participant stations. All signal path-attenuation values are arrayed in an attenuation matrix in the central control unit SE, as shown in FIG. 2. They clearly show that a signal path-attenuation exists between each participant station T111, . . . ,T222 and each sector S11, . . . ,S22 such that the shaded areas characterize a signal path between the participant stations and their associated base station sectors, for which no attenuation measurements must be performed. Then only the signal paths between the participant stations and the remote sectors in which they are not located are of interest for the later to be determined interferences.

Instead of transmitting the test channel from the base stations BS1,BS2 into the respective sectors S11, . . . , S22, the test channel can also be transmitted from each individual participant station T111, . . . ,T222 one after the other and received by the sectors of the base stations BS1,BS2 and hence the corresponding signal path attenuation values or results are calculated.

Thus each participant station T111, . . . ,T222, when it determines the individual signal path-attenuation value, knows from which sector S11, . . . ,S22 of the base station BS1,BS2 the test channel is transmitted, and besides the information regarding the transmission power transmitted in the test channel also has a knowledge of the base station BS1,BS2 and the sector S11, . . . ,S22 from which the immediately received test channel was transmitted. If under certain circumstances in one signal path the test channel from individual participant stations cannot be demodulated because its attenuation is too large, it is suitable or appropriate to transmit the test channel in a known time pattern to all participant stations T111, . . . ,T222 and to all sectors S11, . . . ,S22 of the base stations BS1,BS2. Furthermore a synchronizing clock signal must be present at all participant stations and all sectors of the base stations. Because of possible frequency selective fading, which naturally also occur on the narrow band test channel, it is appropriate to repeat transmission of the test channel once again on another frequency.

The already mentioned central control unit SE takes control of transmission of the test channel and the subsequent compilation of all signal path-attenuation.

In FIG. 3 a flow diagram is shown which illustrates a method of operation of the central control unit. Both method steps 1 and 2 were already described.

When the matrix for the signal path-attenuation is completely present, next the interferences for the outbound link are determined by the control unit SE. The interference associated with each signal path is accordingly subsequently calculated. For example, a signal at the participant station T111 in sector S11 transmitted from the sector S12 of the base station BS1 causes an interference, which results from the product between the useful signal power transmitted from the base station BS1 in sector S12 and the signal path-attenuation value between the sector S12 and the participant station T111. Since the central control unit SE knows both the signal path-attenuation value and the transmitted power of the useful signal sent from the base station BS1 into the sector S12, it can calculate this product. Thus it can determine the associated interference with each signal path-attenuation value and store the interferences of all signal paths in a matrix according the pattern of FIG. 2.

In the next method step 4 the carrier signal-to-noise ratio C/ΣI is determined. C is the power of the useful signal received by the concerned participant station, which was transmitted by the base station in the sector in which the concerned participant station is located. ΣI is the sum of all interferences, which all other base station sectors produce at the concerned participant station on transmission of the respective useful signals. The central control unit SE determines the received power of each participant station from the signal path attenuation and the transmission power of the concerned signals. The central control unit SE forms the sum ΣI for each participant station from the interferences determined in the previous method step 3.

A threshold value test for the carrier signal-to-noise ratio C/ΣI is performed now in method step 5 for each participant station T111, . . . , T222. If the carrier signal-to-noise ratio C/ΣI is greater than a threshold S1 (of e.g. 21 dB), the interferences are so weak that no steps for the reduction of interferences are performed. In this case the decision block 5 transfers control back so that the carrier signal-to-noise ratio C/ΣI for the next participant station is tested by comparing it with the threshold S1. If generally carrier signal-to-noise ratio C/ΣI is below the threshold S1, then a robust modulation method is selected for the associated sector of the base station. The following selection of modulation methods and code rates is available: QPSK with a code rate 1/2, QPSK with a code rate 3/4, QPSK with a code rate 7/8, 8 PSK with a code rate 2/3, 16 PSK with a code rate 3/4. As the robustness of the modulation decreases, generally the bandwidth efficiency increases, from the first-named modulation type to the last-named modulation type. Naturally it is desirable to use a modulation value and code rate with has high as possible a bandwidth efficiency. When the carrier signal-to-noise ratio does not permit that, then a modulation type and code rate with a greater robustness is used.

If the transmission in a robust modulation method in method step 6 does not lead to the desired transmission quality, in process step 7 a frequency restriction may be performed. This frequency restriction can also alternatively be performed to the modulation choice. Frequency restriction means in this connection that another frequency channel is selected for the dominant interference signal path. After that a new determination of the carrier signal-to-noise ratio occurs and then a shift of the frequency channel can be performed into the signal path with the next largest interference. This method is continually performed until the carrier signal-to-noise ratio exceeds the threshold S1. The control unit SE stores the resulting frequency channel distribution appropriately in a single frequency matrix.

The interferences for the inbound link are determined in method step 8 parallel to or after the interference analysis for the outbound link. The interference, which a participant station produces with its transmitted signal in another sector of a base station, results from the product of the transmission power of the participant station and the attenuation, which was determined in method step 2 for the signal path between the concerned sector and the participant station. When the central control unit SE has all signal path attenuation present in the attenuation matrix and also the transmission power of the individual participant stations or at least can make a realistic assumption, it is in a position to calculate the interferences for all signal paths. It then appropriately stores the determined interferences in a single matrix.

In method step 9 the carrier signal-to-noise ratio C/ΣI is determined for all sectors of the base station. C is the power of a useful signal received by a sector of a base station, which was; transmitted by a participant station belonging to the sector. ΣI is the sum of all interferences caused in the concerned sector which other participant stations not located in the sector cause.

In method step 10, as already mentioned for the outbound link, the carrier signal-to-noise ratio for each sector is compared with a threshold S2. If the carrier signal-to-noise ratio is greater than the threshold S2 (of e.g. 21 dB), thus no steps by which the interference is reduced need to be performed or taken. If however the carrier signal-to-noise ratio is lower than the threshold S2, the transmitted power at the participant station which produces the strongest interference in the sector is reduced in step 11. Also the transmission power for the reduced strength interfering participant stations can be reduced until a carrier signal-to-noise ratio is reached which is above the threshold S2.

Additionally or alternatively to the transmission power reduction a frequency restriction can be performed in the method step 12, as has already been described in connection with the outbound link. Those signal paths for which a frequency change has already been made in the frequency matrix in the interference analysis in the outbound link need not be considered in the transmission power reduction and the frequency restriction. Then those signal paths for which a frequency restriction for the outbound link has already been performed can form no interferences in the inbound link on account of the reciprocity of the transmission.

Since the above-described interference analysis was performed both for the outbound link and also for the inbound link, finally in method step 13 frequency channels for the data transmission are assigned to all participant stations and sectors of the base stations considering the frequency restriction required for reduction of the interferences.

The previously described methods may be used not only in point-to-multipoint radio transmission systems with multiple access in frequency division multiplex (FDMA), but also in systems with multiple access in time division multiplex (TDMA), in code division multiplex (CDMA) or in space division multiplex (SDMA).

The disclosure in German Patent Application 196 46 371.8 of Nov. 9, 1997 is incorporated here by reference. This German Patent Application describes the invention described hereinabove and claimed in the claims appended herein in below and provides the basis for a claim of priority for the instant invention under 35 U.S.C. 119.

While the invention has been illustrated and described as embodied in an apparatus and method for improvement of transmission quality in a point-to-multipoint radio transmission system, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A method for improving transmission quality in a point-to-multipoint radio transmission system, said radio transmission system comprising at least one base station (BS1,BS2) and a plurality of participant stations (T111, T112,T121,T211,T221,T222), said at least one base station (BS1,BS2) having an associated radio transmission range (Z1,Z2) comprising at least one sector (S11, . . . , S22) and said at least one base station (BS1,BS2) having a transmitter/receiver unit for said at least one sector (S11, . . . ,S22), so that data transmission takes place between said at least one base station (BS1,BS2) and said participant stations (T111, . . . ,T222) located in the at least one sector (S11, . . . , S22) in which the at least one base station is located, said method comprising the steps of:

a) transmitting a test channel between each of said participant stations (T111, . . . ,T222) and said transmitter/receiver units of said at least one sector (S11, . . . ,S22) which cause interference with said participant station (T111, . . . ,T222) to which the test channel is transmitted;

b) determining respective signal path-attenuation values from transmitted power and received power of said test channel for each signal path between the participant stations (T111, . . . ,T222) and the transmitter/receiver units of said at least one sector (S11, . . . , S22);

c) determining a carrier signal-to-noise ratio for each of said participant stations (T111, . . . ,T222) from said signal path-attenuation values for all of said signal paths contributing to said carrier signal-to-noise ratio;

d) when the carrier signal-to-noise ratio is below a predetermined threshold (S1) for one of said participant stations (T111, . . . , T222), changing a modulation of a data signal transmitted between said one of said participant stations and said transmitter/receiver units of said at least one sector (S11, . . . ,S22) in which said one of said participant station is located into a robust modulation and/or changing a transmission signal carrier for said one of said participant stations from one frequency channel to another frequency channel, at least in one of said at least one sector (S11, . . . ,S22) causing a largest amount of said interference for said one of said participant stations (T111, . . . ,T222).

2. The method as defined in claim 1, further comprising determining said carrier signal-to-noise ratio for each of said at least one sector from said signal path-attenuation values associated with said respective sector for which the signal-to-noise ratio is being determined, and reducing transmission power and/or switching a transmission signal carrier from one frequency channel to another when said signal-to-noise ratio is below a predetermined threshold (S2), at least for one of said participant stations which causes a largest amount of said interference for said at least one sector.

3. The method as defined in claim 1, wherein said test channel includes information regarding transmission power and regarding which of said at least one sector (S11, . . . ,S22) and/or which of said participant stations (T111, . . . ,T222) are transmitting said transmission power.

4. The method as defined in claim 1, wherein said test channel is transmitted from individual ones of said at least one sector (S11, . . . ,S22) or said participant stations (T111, . . . ,T222) in a predetermined fixed time pattern.

5. The method as defined in claim 1, wherein said signal path-attenuation values for said signal paths are computed by a single central control unit (SE), the carrier signal-to-noise ratios are computed by said central control unit (SE) and whether or not said carrier signal-to-noise ratios are below said predetermined threshold is determined by performing a threshold test in said central control unit (SE), and further comprising storing said signal path-attenuation values by means of the central control unit (SE) in an attenuation matrix.

6. The method as defined in claim 5, wherein the changing of the frequency channels is performed by the central control unit (SE) so as to distribute the frequency channels for individual ones of the signal paths between said participant stations (T111, . . . ,T222) and said at least one sector associated therewith, and further comprising storing said frequency channels in a frequency channel matrix by means of the central control unit (SE).

7. The method as defined in claim 1, further comprising repeat transmission of the test channel between said participant stations (T111, . . . ,T222) and said at least one sector (S11, . . . ,S22) with other carrier frequencies.

8. The method as defined in claim 1, further comprising periodically repeating said transmitting, determining and changing said modulation and/or changing said frequency channels to account for changing interference conditions.

9. The method as defined in claim 1, further comprising repeating said transmitting, determining and changing said modulation and/or changing said frequency channels whenever a new additional one of said participant stations is installed to account for changing interference conditions.

10. The method as defined in claim 1, further comprising repeating said transmitting, determining and changing said modulation and/or changing said frequency channels whenever changes surrounding building structure and/or vegetation occur during operation to account for changing interference conditions.

11. An apparatus for improving transmission quality in a point-to-multipoint radio transmission system, said apparatus comprising at least one base station (BS1,BS2) and a plurality of participant stations (T111,T112,T121, T211, T221,T222), said at least one base station having an associated radio transmission range (Z1,Z2) comprising at least one sector (S11, . . . , S22) and said base station having a transmitter/receiver unit for each of said at least one sectors, so that data transmission takes place between said at least one base station (BS1,BS2) and said participant stations (T111, . . . ,T222) located in the at least one sector (S11, . . . , S22) in which said at least one base station is located, and a central control unit (SE), wherein said central control unit (SE) includes
      means for establishing a test channel between each of said participant stations (T111, . . . ,T222) and said transmitter/receiver units of said at least one sector (S11, . . . ,S22) which cause interference with said participant station (T111, . . . ,T222) receiving the test channel;
      means for determining respective signal path-attenuation values from transmitted power and received power of said test channel for each signal path between the participant stations (T111, . . . ,T222) and the transmitter/receiver units of said at least one sector (S11, . . . , S22);

means for determining a carrier signal-to-noise ratio for each of said participant stations (T111, . . . ,T222) from said signal path-attenuation for all of said signal paths contributing to said carrier signal-to-noise ratio; and means for changing a modulation of a data signal transmitted between one of said participant stations and said at least one sector (S11, . . . ,S22) associated therewith into a robust modulation and means for changing a transmission signal carrier for said one of said participant stations from one frequency channel to another frequency channel at least in one of said at least one sector (S11, . . . ,S22) causing the greatest amount of said interference for said one of said participant stations (T111, . . . ,T222), when the carrier signal-to-noise ratio is below a predetermined threshold (S1) for said one of said participant stations (T111, . . . , T222).

12. An apparatus as defined in claim 11, wherein said central control unit (SE) includes means for reducing transmission power and means for switching a transmission signal carrier from one frequency channel to another when said signal-to-noise ratio is below a predetermined threshold (S2), at least for one of said participant stations which causes a largest amount of said interference for said at least one sector, and means for determining said carrier signal-to-noise ratio for said at least one sector from said signal path-attenuation values associated with said at least one sector for which the signal-to-noise ratio is being determined.

* * * * *